United States Patent [19]
Orimo et al.

[11] Patent Number: 5,522,714
[45] Date of Patent: Jun. 4, 1996

[54] DRIVING MECHANISM FOR DRIVING A GEAR PUMP FOR FORCING A HIGHLY VISCOUS RESIN

[75] Inventors: Taiji Orimo; Masashi Konno; Shinichi Fukumizu; Nobuki Nagami, all of Takasago; Jun Yamanaka; Toru Yomogida, both of Kaizuka, all of Japan

[73] Assignee: Kabushiki Kaisha Kobe Seiko Sho, Kobe, Japan

[21] Appl. No.: 61,289

[22] Filed: May 14, 1993

[51] Int. Cl.⁶ .............................. F04C 2/18; F16D 1/12; F16H 35/00
[52] U.S. Cl. .................. 418/206; 74/395; 464/154; 464/156; 464/159
[58] Field of Search .................. 418/206, 206.1, 418/206.2; 417/410.4; 74/395; 29/888.023; 464/147, 154, 156, 158, 159

[56]  References Cited

U.S. PATENT DOCUMENTS 2,906,106  9/1959  Haas .......................................... 464/156
4,789,376  12/1988  Grant ......................................... 464/154

FOREIGN PATENT DOCUMENTS

287882  8/1929  United Kingdom ..................... 74/395

Primary Examiner—John J. Vrablik
Attorney, Agent, or Firm—Oblon, Spivak, McClelland, Maier & Neustadt

[57]  ABSTRACT

A driving mechanism for driving a gear pump of a dual drive type having two shafts comprises a reversing gear having a pair of output shafts which rotate respectively in opposite directions at the same rotating speed, and a pair of gear couplings connecting the gear pump to the reversing gear. One of the pair of gear couplings comprises: a shaft, a first coupling head disposed on one end of the shaft, and a second coupling head disposed on the other end of the shaft. The number $z_1$ of teeth of the component external spur gears and internal spur gears of the first coupling head is not equal to the number $z_2$ of teeth of the component external spur gears and internal spur gears of the second coupling head. The angular difference between the external spur gears of the second coupling head is converted into a corresponding number of teeth of the external spur gear of the third coupling sleeve by calculation using the difference between the central angle including one tooth of the external gear of the first coupling head and the central angle including one tooth of the external gear of the second coupling head, and the third coupling sleeve is turned through an angle corresponding to the calculated number of teeth.

4 Claims, 9 Drawing Sheets

DRIVING MECHANISM FOR DRIVING A GEAR PUMP FOR FORCING A HIGHLY VISCOUS RESIN

BACKGROUND OF THE INVENTION

1. Field of the Invention

The present invention relates to a driving mechanism for driving a gear pump of a dual drive type for imparting pressure to a molten, highly viscous resin and, more particularly, to a driving mechanism facilitating the alignment of a coupling for coupling the driving mechanism and a gear pump of a two-shaft drive type for pumping a molten, highly viscous resin.

2. Description of the Prior Art

FIGS. 5 to 9 show a known driving mechanism for driving a gear pump of a two-shaft drive type for imparting pressure to a molten, highly viscous resin. The general construction of a kneading/pelletizing machine provided with a gear pump for imparting pressure to the material will be described with reference to FIG. 9 prior to the description of a driving mechanism. The kneading/pelletizing machine comprises a kneader 31, a gear pump 32 and a pelletizer 33. A material containing a resin and additives is supplied continuously at a fixed rate from a hopper 34 into the chamber 35 of the kneader 31. The material is kneaded in the chamber 35 with two parallel rotors 36 extended within the chamber 35 while the same is heated for melting. Then, the molten material is fed by pressure to the pelletizer 33 by a gear pump 32 connected to the discharge port 37 of the kneader 31. The pelletizer 33 extrudes the molten material fed by pressure thereto by the gear pump 32 through a die, and cuts the extruded material with a rotary knife rotating at a high rotating speed to produce pellets continuously.

Figure 5:
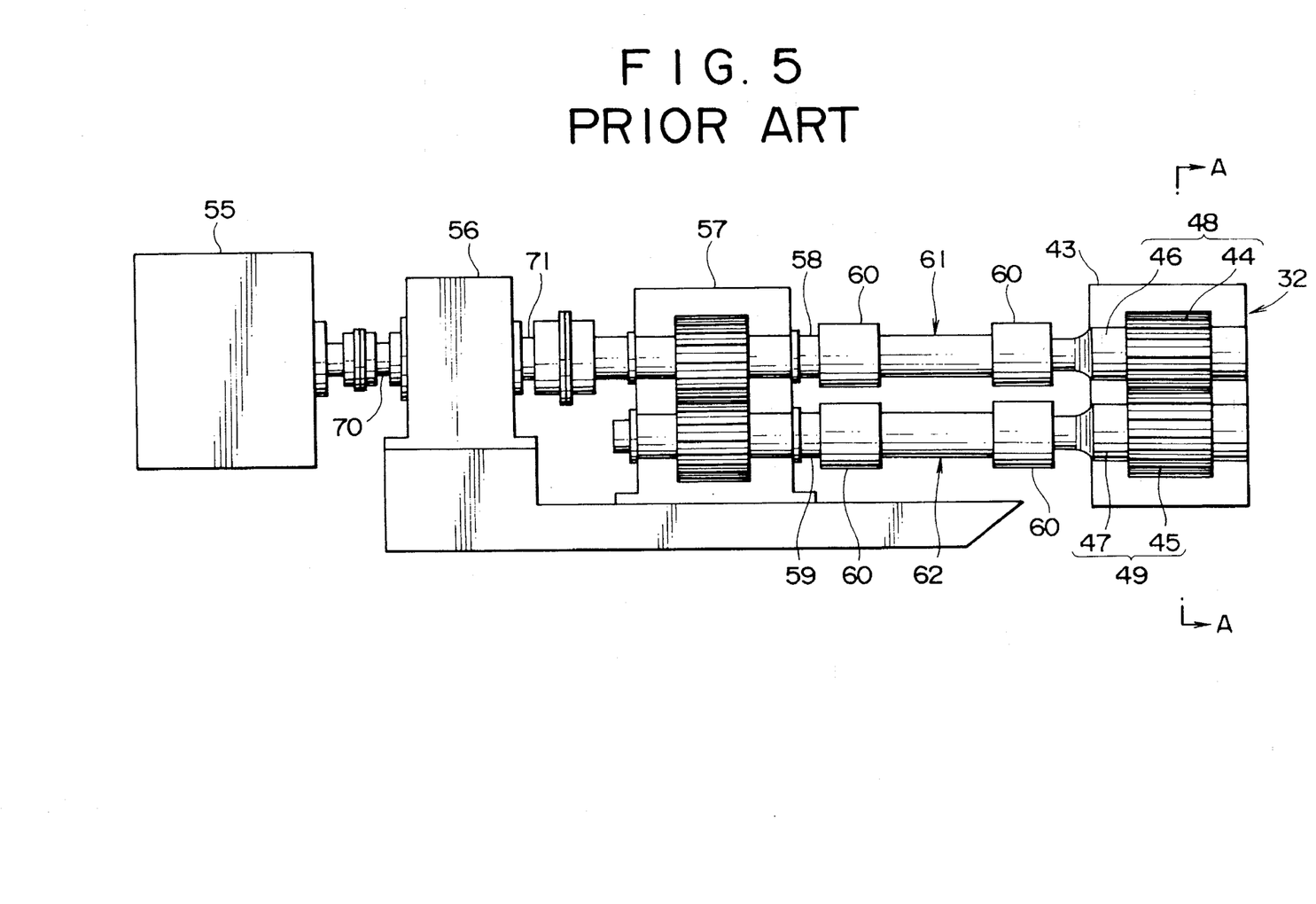
FIG. 5 is a partly sectional view of a known driving mechanism combined with a gear pump for pumping a highly viscous resin.
Figure 6:
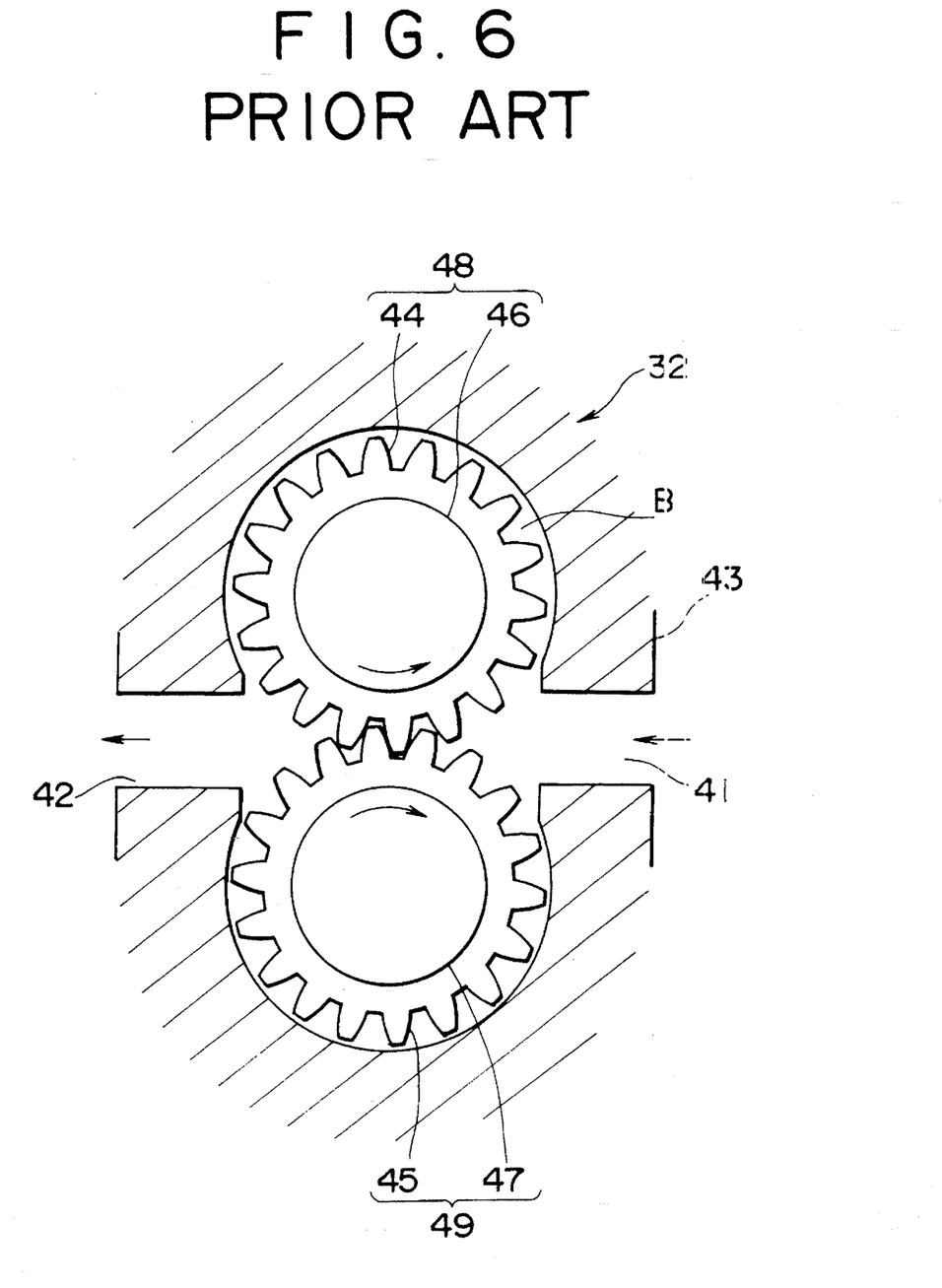
FIG. 6 is a sectional view taken on line 6—6 in FIG. 5.

Referring to FIGS. 5 and 6, the gear pump 32 comprises a pump case 43 having an inlet port 41 connected to the kneader 31 and an outlet port 42 connected to the pelletizer 33, and a pair of gear rotors 48 and 49 integrally having gear wheels 44 and 45 and shafts 46 and 47, respectively, and disposed with the axes of the shafts 46 and 47 in parallel to each other within the pump case 43. The pair of gear rotors 48 and 49 are rotated respectively in opposite directions to suck the molten material through the inlet port 41. The molten material is confined in spaces B defined by the teeth of the gear wheels 44 and 45 and the inner surface of the pump case 43, conveyed toward the outlet port 42 as the gear wheels 44 and 45 rotate and delivered at a high pressure through the outlet port 42 into the pelletizer 33. When the molten material has a relatively low viscosity, only one of the gear wheels 44 and 45 may be driven by a driving mechanism and the other gear wheel engaging the gear wheel driven by the driving mechanism is driven by the former gear wheel. When the molten material has a relatively high viscosity, the tooth faces of the engaged gear wheels 44 and 45 are abraded rapidly due to the insufficient lubricating performance of the molten material and the abrasive action of the additives, if only one of the gear wheels 44 and 45 is driven positively. Accordingly, a gear pump of a dual drive type having a pair of gear wheels which are not engaged and driven individually is employed in pumping such a molten material having a relatively high viscosity.

Figure 7:
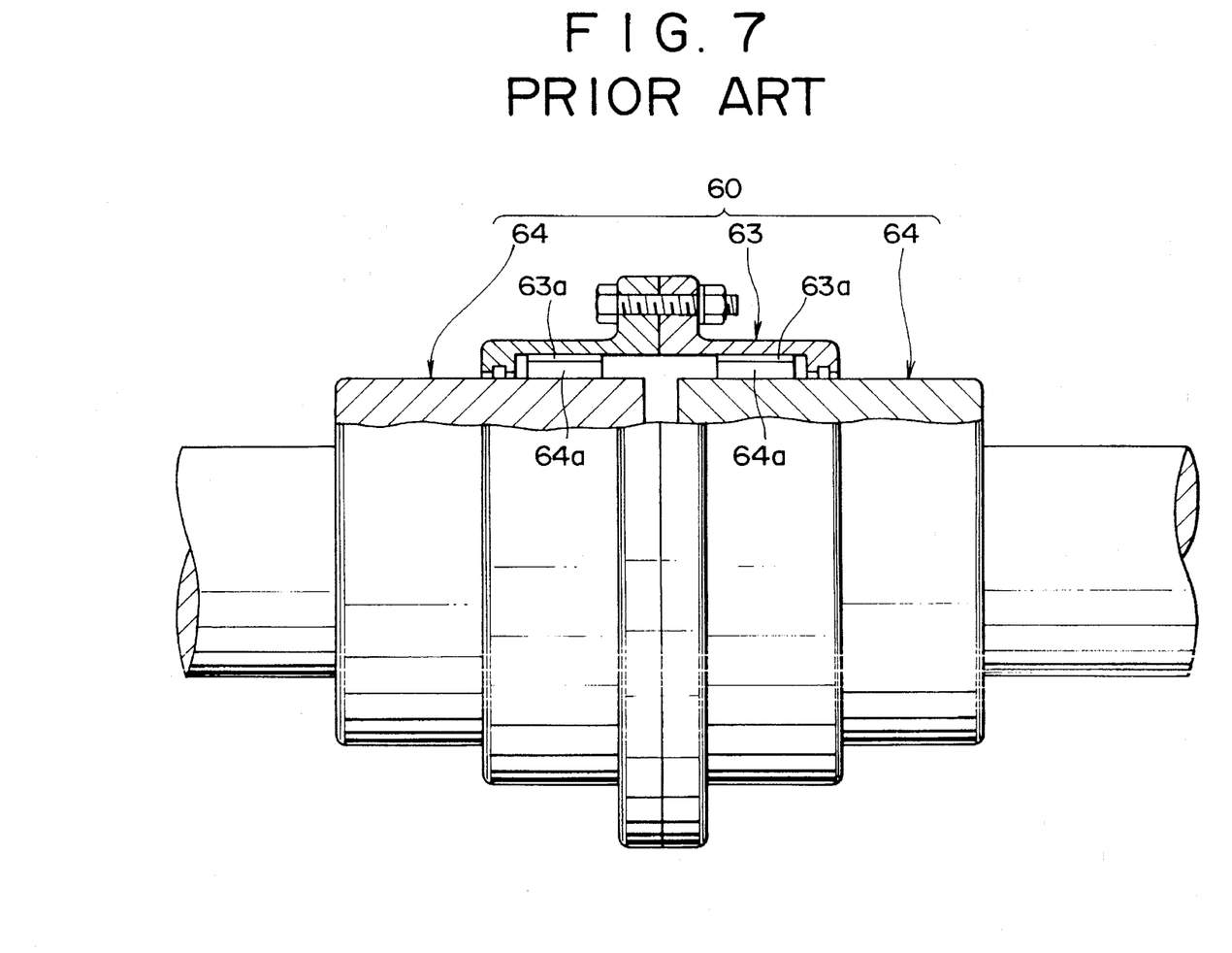
FIG. 7 is a partly sectional view of a portion of a known gear coupling.

Referring to FIG. 5, a driving mechanism for driving both the shafts 46 and 47 of the gear pump 32, the driving mechanism comprises a motor 55, a reduction gear 56 for reducing the output speed of the motor 55 and increasing the output torque of the motor 55, and a reversing gear 57 having two output shafts 58 and 59 that rotate synchronously in opposite directions, respectively, at the same rotating speed. The shafts 46 and 47 of the gear pump 32 are connected to the output shafts 58 and 59 of the reversing gear 57 with a pair of gear couplings 61 and 62 each having coupling heads 60 at the opposite ends thereof, respectively. As shown in FIG. 7, each coupling head 60 has two sets of coupling units each comprising a coupling case 63 provided with an internal spur gear 63a, and a coupling block 64 provided with a crowned, external spur gear 64a engaging the internal spur gear 63a of the coupling case 63. The internal spur gears 63a and the external spur gears 64a are engaged properly even if the output shafts 58 and 59 of the reversing gear 57 are not aligned precisely with the shafts 46 and 47 of the gear pump 32, so that the driving force of the driving mechanism can be smoothly transmitted to the gear pump 32.

Figure 8:
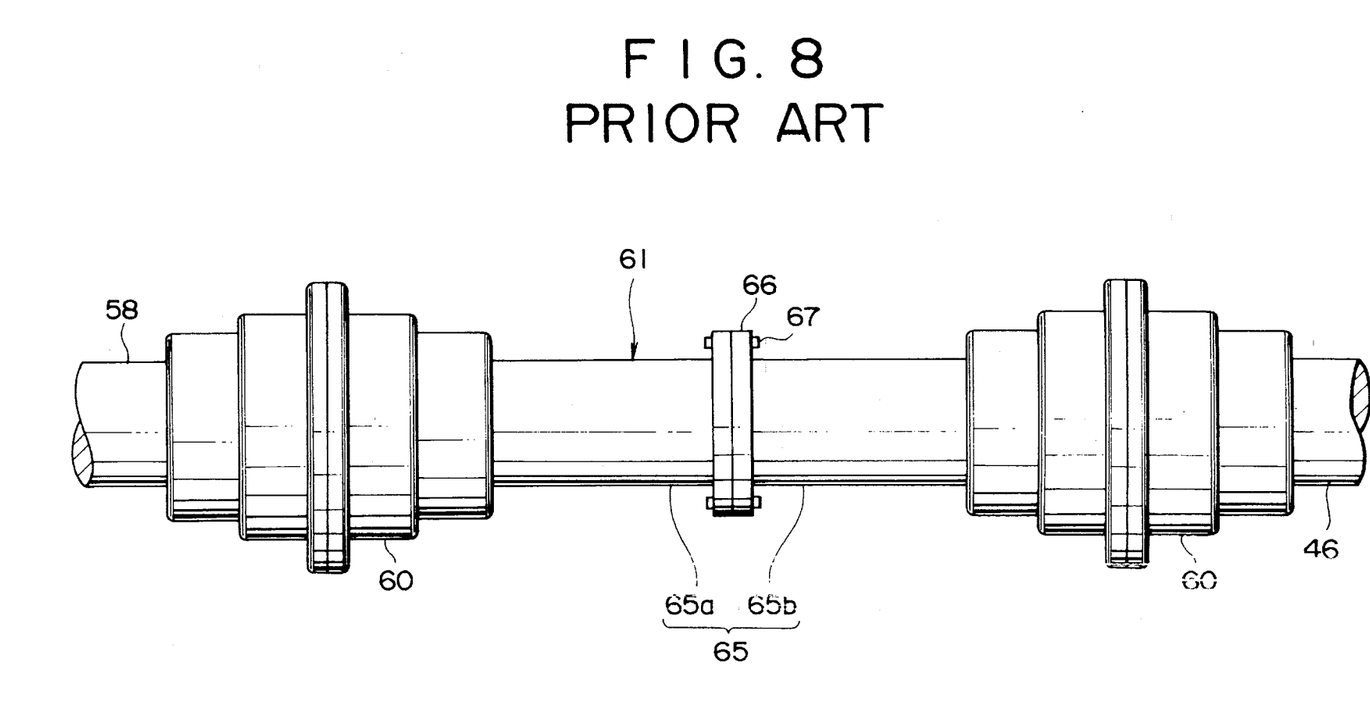
FIG. 8 is a front view of a known gear coupling.
Figure 9:
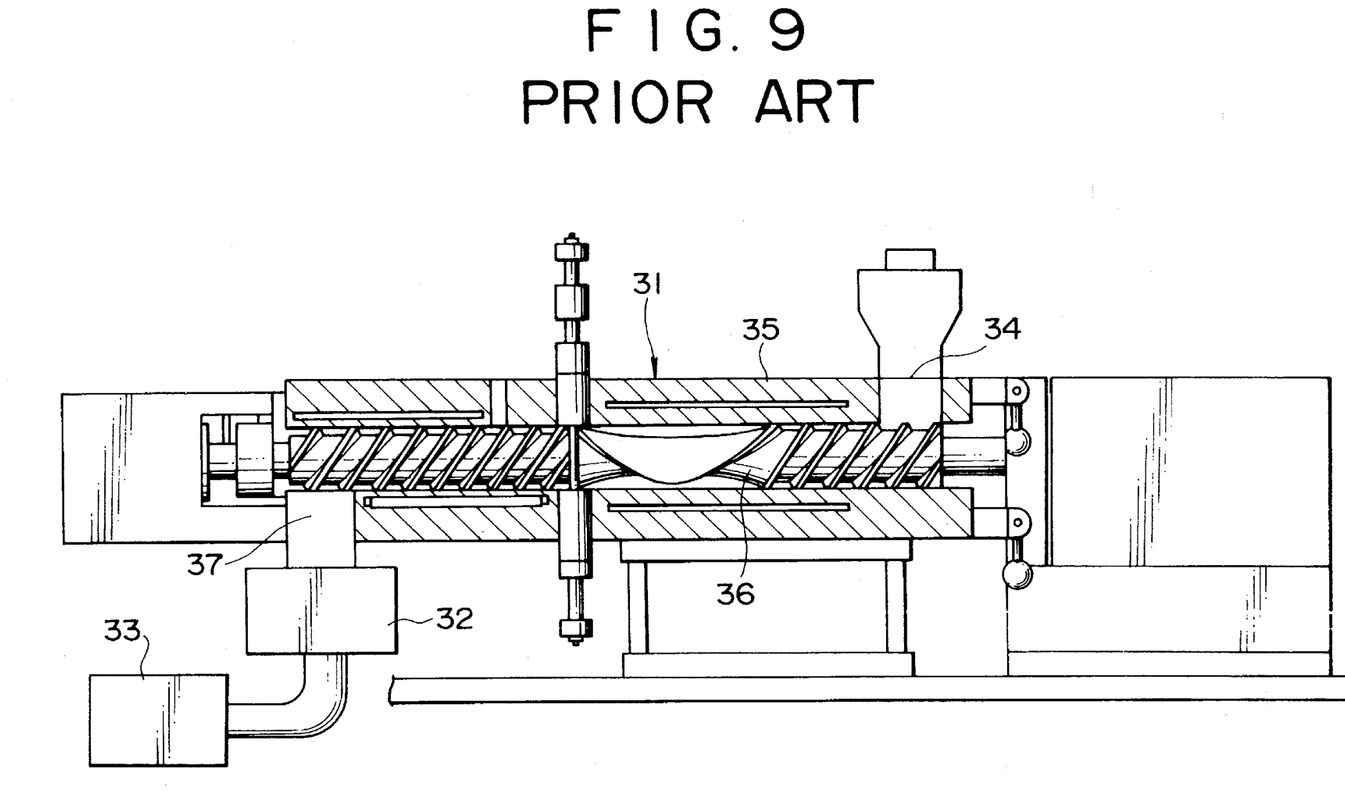
FIG. 9 is a longitudinal sectional view of a kneading/pelletizing machine.

When connecting the gear pump to the driving mechanism, the upper coupling 61 and the lower gear coupling 62 are disposed between the output shafts 58 of the reversing gear 57 and the shaft 46 of the gear pump 32 and between the output shaft 59 of the reversing gear 57 and the shaft 47 of the gear pump 32, respectively, and both the coupling heads 60 of the lower gear coupling 62, and the coupling head 60 of the upper gear coupling 61 on the side of the reversing gear 57 are assembled. Then, the respective angular positions of the gear wheels 44 and 45 of the gear pump 32 are adjusted so that the backlash is divided equally for the opposite sides of each tooth of the gear wheels 44 and 45, that is, the angular positions of the gear wheels 44 and 45 are adjusted so that each tooth of one of the gear wheels 44 and 45 is positioned at the middle of the tooth space between the adjacent teeth of the other gear wheel and the teeth of the gear wheels 44 and 45 are not engaged. Then, the coupling head 60 of the upper gear coupling 61 on the side of the gear pump 32 is assembled. In this state, the respective phases of the two external spur gears 64a of the coupling head 60 of the upper gear coupling 61 on the side of the gear pump 32 are not equal to each other. Therefore, the shaft 65 of the upper gear coupling 61 is divided into two portions 65a and 65b, and the two portions 65a and 65b are connected together with a flange coupling 66 so that both the external spur gears 64a of the coupling head 60 engage the corresponding internal spur gears 63a, and then the relative position of the components of the flange coupling 66 is fixed with locating pins 67.

When connecting the gear pump 32 to the reversing gear 57, the flange coupling 66 must be adjusted by delicate gaging requiring skill to compensate the difference between the respective phases of the external spur gears 64a of the coupling head 60 of the upper gear coupling 61 on the side of the gear pump 32. The kneading/pelletizing machine of this kind is subjected to overhaul once a year for the replacement of abraded parts including the gears, and the foregoing delicate gaging of the flange coupling 66 is required every time the kneading/pelletizing machine is overhauled.

SUMMARY OF THE INVENTION

Accordingly, it is an object of the present invention to provide a driving mechanism for driving a gear pump for pumping a highly viscous resin, provided with coupling means having coupling mechanisms capable of being easily adjusted without requiring skill to compensate the difference between the respective phases of parts to be connected together.

The present invention provides a driving mechanism for driving a gear pump of a dual drive type for pumping a highly viscous resin, comprising a pump case provided with an inlet port and an outlet port and a pair of gear rotors each having a gear wheel and a shaft, and disposed within the pump case with the gear wheels positioned so that the tooth faces of the gear wheels are not in contact with each other. The driving mechanism comprises a reversing gear having a pair of output shafts which rotate in opposite directions, respectively, at the same rotating speed, and a pair of gear couplings for connecting the two shafts of the gear pump respectively to the two output shafts of the reversing gear, each provided with coupling heads at its opposite ends. The respective numbers of teeth of gears included in the coupling heads of one of the gear coupling are different from each other.

Since the number of teeth of the gear of the coupling head of the gear coupling on the side of the reversing gear and that of the teeth of the gear of the coupling head of the same gear coupling on the side of the gear pump are different from each other, these gears differ from each other in the central angle including one tooth.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

The general construction and functions of a driving mechanism in a preferred embodiment according to the present invention for driving a gear pump of a dual drive type for pumping a highly viscous resin are similar to those of the known driving mechanism previously described with reference to FIGS. 5 to 9, and only an upper gear coupling employed in the driving mechanism of the present invention is different from the upper gear coupling employed in the known driving mechanism. Accordingly, only the upper gear coupling of the driving mechanism embodying the present invention will be described hereinafter, in which parts shown in FIGS. 1, 2(a) and 2(b) like or corresponding to those described previously with reference to FIGS. 5 to 9 are denoted by the same reference characters and the description thereof will be omitted.

Figure 1:
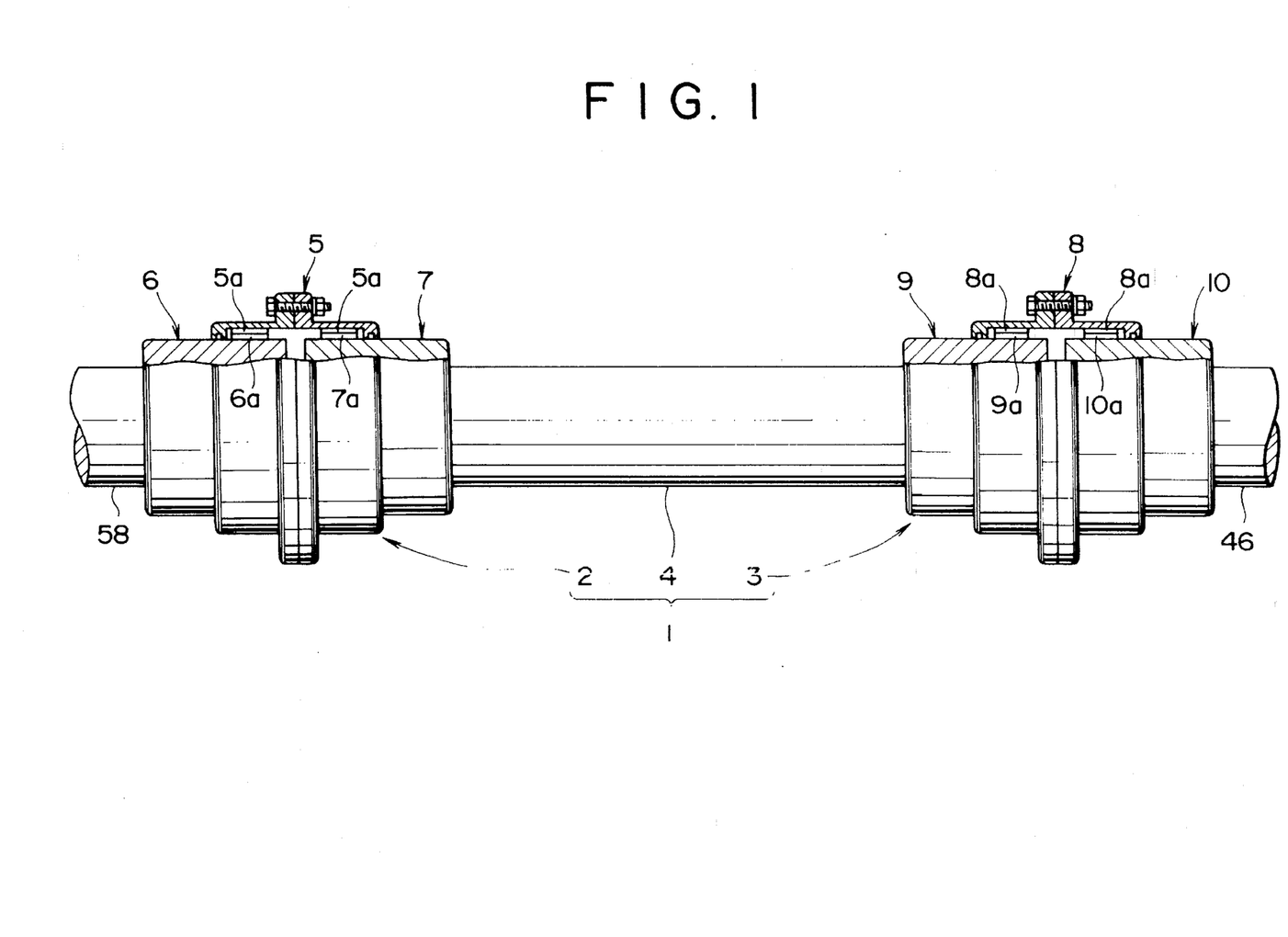
FIG. 1 is a partly sectional view of an upper gear coupling employed in a driving mechanism in a first embodiment according to the present invention.

The gear pump 32 is connected to the reversing gear 57 by an upper gear coupling 1 and the lower gear coupling 62, which is the same as the lower gear coupling 62 employed in the known driving mechanism. Referring to FIG. 1, an upper gear coupling 1 comprises a first coupling head 2 on the side of the output shaft 58 of the reversing gear 57, a second coupling head 3 on the side of the shaft 46 of the gear pump 32, and a transmission shaft 4 provided with the first coupling head 2 and the second coupling head 3 on its opposite ends, respectively. The first coupling head 2 has a coupling case 5 provided with internal spur gears 5a, and coupling sleeves 6 and 7 provided with external spur gears 6a and 7a, respectively. The second coupling head 3 has a coupling case 8 provided with internal spur gears 8a, and coupling sleeves 9 and 10 provided with external spur gears 9a and 10a. The number of teeth of the internal spur gears 5a and the external spur gears 6a and 7a of the first coupling head 2 is $z_1$, and the number of teeth of the internal spur gears 8a and the external spur gears 9a and 10a of the second coupling head 3 is $z_2$, which is different from the number $z_1$ of teeth; for example, $z_2=z_1+1$. Therefore, the central angle including one tooth of the spur gears 5a, 6a, 7a is $2\pi/z_1$, the central angle including one tooth of the spur gears 8a, 9a and 10a is $2\pi/z_2$, and $2\pi/z_1 \neq 2\pi/z_2$. When adjusting the phase of the upper gear 44 of the gear pump 32 relative to the lower gear 45 of the same, the coupling cases 5 and 8 of the coupling heads 2 and 3 are removed, the coupling sleeves 7 and 9 are fastened to the shaft 4, the shaft 4 is supported so as to be able to rotate, the coupling sleeves 6 and 10 are fixed, and then the shaft 4 is turned together with the coupling sleeves 7 and 9 through an angle corresponding to one tooth pitch of the external spur gear 7a of the coupling sleeve 7. Consequently, the teeth of the external spur gear 9a of the coupling sleeve 9 is shifted in the turning direction relative to the teeth of the external spur gear 10a of the coupling sleeve 10 by an angle of $2\pi/z_1 - 2\pi/z_2 = 2\pi(z_2-z_1)/z_1 \cdot z_2$.

When connecting the gear pump of a dual drive type to the driving mechanism by the upper gear coupling 1 and the lower gear coupling 62, both the coupling heads 60 of the lower gear coupling 62, and the coupling head 2 of the upper gear coupling 1 on the side of the reversing gear 57 are assembled. In this state, the shaft 4 of the upper gear coupling 1 and the shaft 47 of the gear pump 32 are fixed, and then a torque is applied in the normal rotating direction to the input shaft 70 of the reduction gear 56 by means of a turning jig. Consequently, the teeth of the gears of the reversing gear 57, the teeth of the external spur gears 64a and the internal spur gears 63a of the coupling heads 60 of the lower gear coupling 62, and the teeth of the external spur gear 6a and the internal spur gear 5a of the first coupling head 2 of the upper gear coupling on the side of the reversing gear 57 are brought into driving engagement. Then, shims of the same thickness are put between the tooth faces of the teeth of the gears 44 and 45 of the gear pump 32 and the gear rotor 48 is turned slightly so that the teeth of the gear wheels 44 and 45 of the gear pump 32 are located at the middle of the tooth spaces of the mating gear wheels 44 and 45.

Then, the coupling case 5 of the first coupling head 2 of the upper gear coupling 1 is removed to enable the coupling sleeves 7 and 9 fixed to the shaft 4 can be turned together with the shaft 4, and then the angular difference between the respective angular positions of the external spur gear 9a and 10a of the second coupling head 3 is determined on the basis of the arc length between the tooth of the external spur gear 9a and the corresponding tooth of the external spur gear 10a.

Figure 2A:
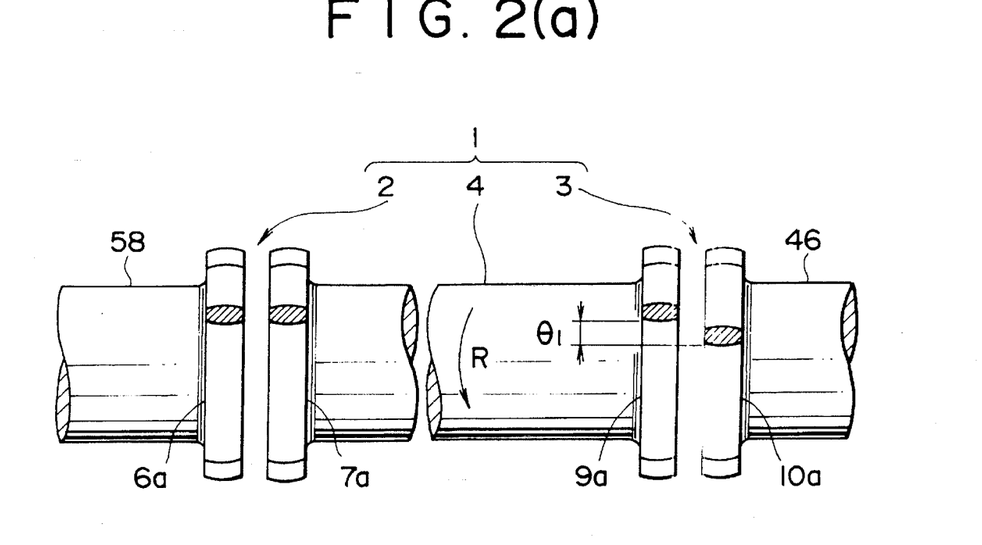
FIGS. 2(a) and 2(b) are views of assistance in explaining a phase adjusting procedure.

If the teeth of the external spur gear 10a are advanced by an angle of $\theta_1$ in the direction of the arrow R relative to the teeth of the external gear 9a as shown in FIG. 2(a), a value $a_1+b_1$ is calculated by using an expression:

$$a_1+b_1=\theta_1/\{2\pi(z_2-z_1)/z_1\cdot z_2\}=\theta_1\cdot z_1\cdot z_2/2\pi(z_2-z_1)$$

where $a_1$ is the integral part and $b_1$ is the decimal part.

Then, the coupling sleeves 7 and 9 fixed to the shaft 4 are turned in the direction of the arrow R through an angle corresponding to the $n_1$ teeth of the external spur gear 7a of the coupling sleeve 7. If $0 \leq b_1 \leq 0.5$, $n_1=a_1$, and if $0.5 < b_1 < 1$, $n_1 = ab+1$.

Figure 2B:
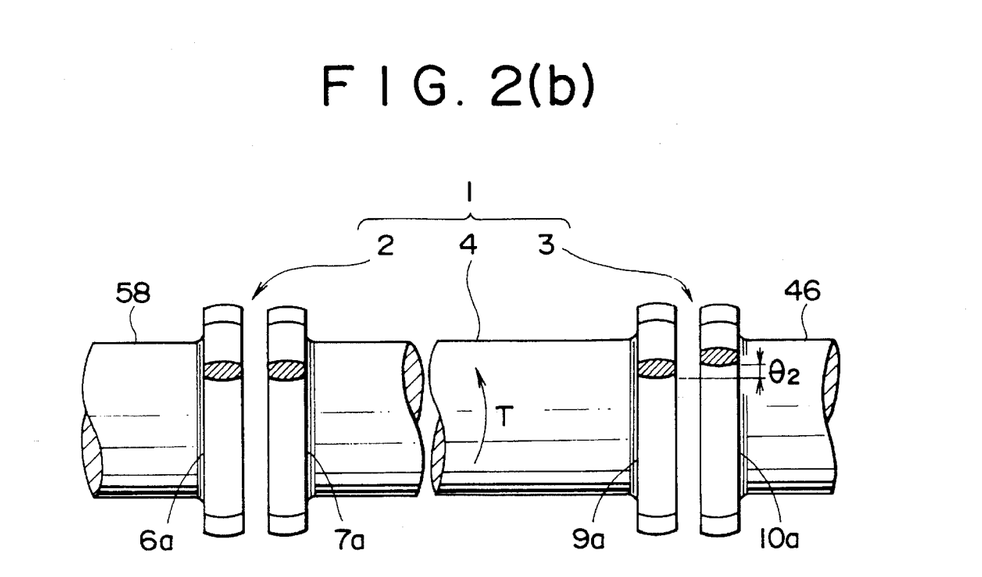

If the teeth of the external spur gear 10a are advanced by an angle of $\theta_2$ in the direction of the arrow T relative to the teeth of the external spur gear 9a as shown in FIG. 2(b), a value $a_2+b_2$ is calculated by using an expression:

$$a_2+b_2=\theta_2/\{2\theta(z_2-z_1)/z_2\}=\theta_2\cdot z_a\cdot z_2/2\pi(z_2-z_1)$$

where $a_2$ is the integral part and $b_2$ is the decimal part.

Then, the coupling sleeves 7 and 9 fixed to the shaft 4 are turned in the direction of the arrow T through an angle corresponding to the $n_2$ teeth of the external spur gear 7a of the coupling sleeve 7. If $0 \leq b_2 \leq 0.5$, $n_2=a_2$, and if $0.5 < b_2 < 1$, $n_2=a_2+1$.

Thus, the respective angular positions of the external spur gears 9i a and 10a of the second coupling head 3 coincide with each other. Then, the coupling case 8 is put on the coupling sleeves 9 and 10 to complete the second coupling head 3, and the coupling case 5 is put on the coupling sleeves 6 and 7 to complete the first coupling head 2. Thus, the shafts 46 and 47 of the gear pump 32 are connected to the output shafts 58 and 59 of the reversing gear 57 by the upper gear coupling 1 and the lower gear coupling 62, respectively.

Thus, the phase adjustment of the second coupling head 3 of the upper gear coupling 1 can be easily achieved without requiring special skill by measuring the angular difference between the angular positions of the external spur gears 9a and 10a of the second coupling head 3, calculating $a_1+b_1$ or $a_2+b_2$ on the basis of the measured angular difference $\theta_1$ or $\theta_2$, and turning the external spur gear 9a through an angle corresponding to $n_1$ or $n_2$ teeth of the external spur gear 7a relative to the external spur gear 10a.

Figure 3:
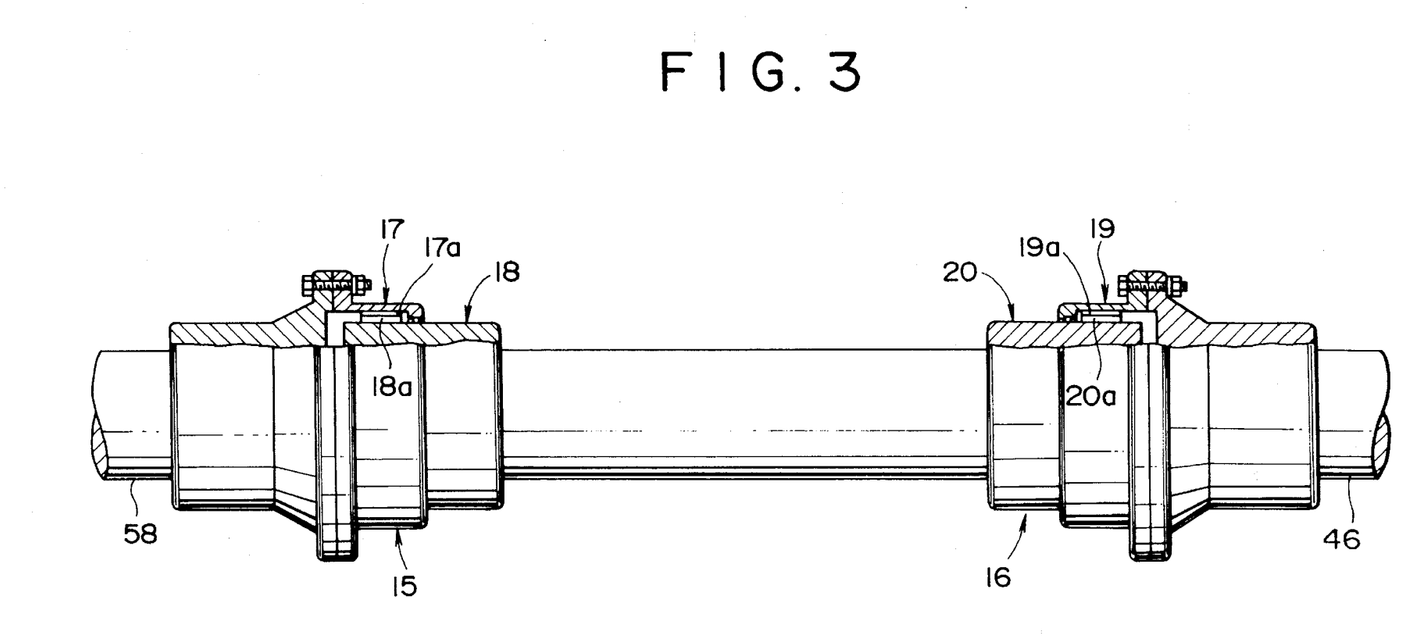
FIG. 3 is a partly sectional view of an upper gear coupling included in a driving mechanism in a second embodiment according to the present invention.

FIG. 3 shows an upper gear coupling employed in a driving mechanism in a second embodiment according to the present invention. As shown in FIG. 3, this upper gear coupling has a first coupling head 15 and a second coupling head 16 each having a single set of an external spur gear and an internal spur gear. The first coupling head 15 on the side of the reversing gear 57 comprises a coupling case 17 provided with an internal spur gear 17a, and a coupling sleeve 18 provided with an external spur gear 18a. The second coupling head 16 on the side of the gear pump 32 comprises a coupling case 19 provided with an internal spur gear 19a, and a coupling sleeve 20 provided with an external spur gear 20a. The number of teeth of each of the internal spur gear 17a and the external spur gear 18a of the first coupling head 15 is $z_3$, the number of teeth of each of the internal spur gear 19a and the external spur gear 20a of the second coupling head 16 is $z_4$, and $z_3 \neq z_4$.

Figure 4:
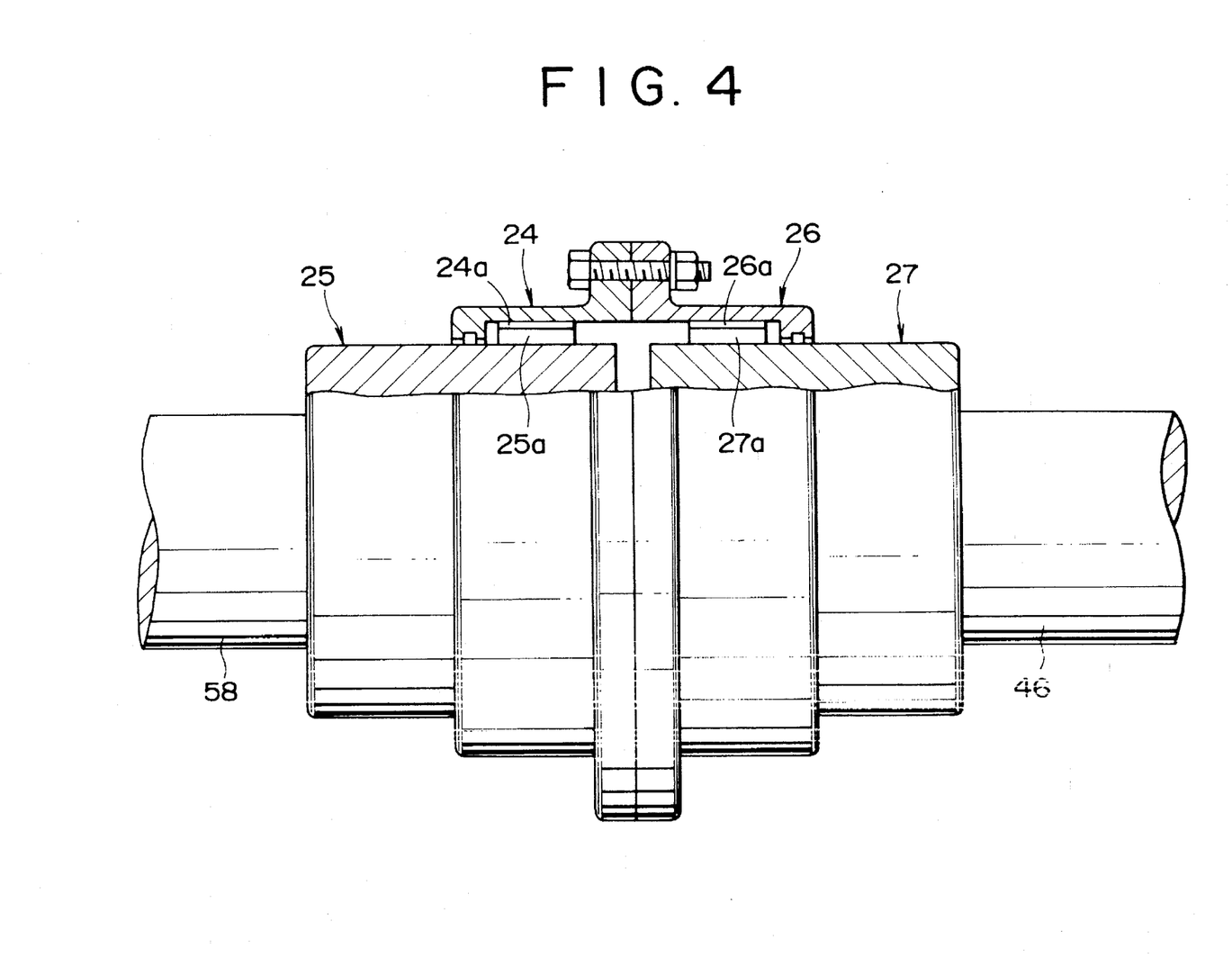
FIG. 4 is a partly sectional view of an upper gear coupling employed in a driving mechanism in a third embodiment according to the present invention.

FIG. 4 shows an upper gear coupling employed in a driving mechanism in a third embodiment according to the present invention. As shown in FIG. 4, the upper gear coupling comprises a single coupling head comprising a first coupling sleeve 25 provided with a first external spur gear 25a and fastened to the output shaft 58 of the reversing gear 57, a first coupling case 24 provided with a first internal spur gear 24a and put on the first coupling sleeve 25 so that the first external gear 25a and the first internal spur gear 24a are engaged, a second coupling sleeve 27 provided with a second external spur gear 27a and fastened to the shaft 46 of the gear pump 32, and a second coupling case 26 provided with a second internal spur gear 26a and put on the second coupling sleeve 27 and fastened to the first coupling case 24 so that the second external spur gear 27a and the second internal spur gear 26a are engaged. The number of teeth of the first internal spur gear 24a of the first coupling case 24 and the first external spur gear 25a of the first coupling sleeve 25 is $z_5$, the number of teeth of the second internal spur gear 26a of the second coupling case 26 and the second external spur gear 27a of the second coupling sleeve 27 is $z_6$, and $z_5 \neq z_6$.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A driving mechanism for driving a gear pump of a dual drive type for pumping a highly viscous material, comprising a pump case provided with an inlet port and an outlet port, and a pair of gear rotors disposed within the pump case to intermesh with each other, each gear rotor having a rotor shaft attached thereto, said driving mechanism comprising:

a reversing gear having a pair of output shafts which rotate respectively in opposite directions at the same rotating speed; and a pair of gear couplings for connecting the two shafts of the gear pump respectively to the two output shafts of the reversing gear, wherein one of the pair of gear couplings comprises:

a first external spur gear and a first internal spur gear positioned around said first external spur gear to engage therewith, one of said first external and internal spur gears being mounted to said output shaft of said reversing gear mechanism;

a second external spur gear and a second internal spur gear positioned around said second external spur gear to engage therewith, one of said second external and internal spur gears being mounted to said gear rotor shaft; and transmission means for transmitting the rotation of said one of said first external and internal spur gears to said one of said second external and internal spur gears, wherein a number of teeth of said first external and internal spur gears is not equal to a number of teeth of said second external and internal spur gears.

2. The driving mechanism of claim 1 wherein said one of said first spur gears comprises said first external gear, and said one of said second spur gears comprises said second external gear.

3. The driving mechanism of claim 2, wherein said transmission means comprises:

a transmission shaft extending between said output shaft of said reversing gear mechanism and said gear rotor shaft;

a third external spur gear mounted to an end of said transmission shaft adjacent said output shaft of said reversing gear mechanism;

a first coupling case having said first internal spur gear and a third internal spur gear mounted thereto, said third internal spur gear engaging with said third external spur gear, said first and third internal and external spur gears and said first coupling case together comprising a first coupling head;

a fourth external spur gear mounted to an end of said transmission shaft adjacent said gear rotor shaft;

a second coupling case having said second internal spur gear and a fourth internal spur gear mounted thereto, said fourth internal spur gear engaging with said fourth external spur gear, said second and fourth internal and external spur gears and said second coupling case together comprising a second coupling head.

4. The driving mechanism of claim 3, further comprising:

a first coupling sleeve on said output shaft of said reversing gear mechanism, said first external spur gear being mounted to said output shaft of said reversing gear mechanism via said first coupling sleeve;

a second coupling sleeve on said gear rotor shaft, said second external spur gear being mounted to said gear rotor shaft via said second coupling sleeve;

a third coupling sleeve on said transmission shaft, said third external spur gear being mounted to said transmission shaft via said third coupling sleeve; and a fourth coupling sleeve on said transmission shaft, said fourth external spur gear being mounted to said transmission shaft via said fourth coupling sleeve.

* * * * *